United States Patent
Wong

(10) Patent No.: US 8,955,989 B2
(45) Date of Patent: Feb. 17, 2015

(54) SYSTEMS FOR AND METHODS OF CREATING A VISUAL DISPLAY ASSOCIATED WITH A DATA STORAGE LIBRARY ROBOT

(75) Inventor: Walter Wong, Boulder, CO (US)

(73) Assignee: Spectra logic Corporation, Boulder, CO (US)

( * ) Notice: Subject to any disclaimer, the term of this patent is extended or adjusted under 35 U.S.C. 154(b) by 373 days.

(21) Appl. No.: 13/355,670

(22) Filed: Jan. 23, 2012

(65) Prior Publication Data

US 2013/0188279 A1 Jul. 25, 2013

(51) Int. Cl.
*G03B 21/14* (2006.01)

(52) U.S. Cl.
USPC ............... 353/119; 353/31; 353/94; 353/122; 369/30.38; 369/30.49

(58) Field of Classification Search
USPC ........ 353/31, 94, 119, 122; 369/30.38–30.49; 720/632; 700/214, 218, 248, 255; 360/91, 92.1, 98.06
See application file for complete search history.

(56) References Cited

U.S. PATENT DOCUMENTS

| | | | | |
|---|---|---|---|---|
| 5,115,664 | A * | 5/1992 | Hegde et al. | 73/9 |
| 7,446,971 | B2 * | 11/2008 | Thompson et al. | 360/91 |
| 7,707,373 | B2 * | 4/2010 | Murayama et al. | 711/162 |
| 8,690,358 | B2 * | 4/2014 | Larsen et al. | 353/98 |
| 8,782,698 | B2 * | 7/2014 | Gossweiler et al. | 725/39 |
| 2004/0130501 | A1 * | 7/2004 | Kondo et al. | 345/1.1 |
| 2010/0002197 | A1 * | 1/2010 | Kaneko | 353/31 |
| 2011/0245961 | A1 * | 10/2011 | Kobayashi et al. | 700/218 |

OTHER PUBLICATIONS

Spectra Logic, T-Finity brochure, Mar. 2010.

* cited by examiner

*Primary Examiner* — Sultan Chowdhury
(74) *Attorney, Agent, or Firm* — Kenneth Altshuler

(57) ABSTRACT

Systems for and methods of creating a visual display associated with a mobile robot within a data storage library and libraries including such systems and utilizing such methods.

16 Claims, 3 Drawing Sheets

SYSTEMS FOR AND METHODS OF CREATING A VISUAL DISPLAY ASSOCIATED WITH A DATA STORAGE LIBRARY ROBOT

CROSS-REFERENCE TO RELATED APPLICATIONS

None.

BACKGROUND OF THE INVENTION

1. Field of the Invention

The present invention relates to data storage libraries that house a plurality of data storage media such as optical discs, movable solid state storage devices and magnetic tape cartridges. Such libraries include drives for reading data from the media or writing data onto the media and further include a so-called robot adapted to move the media between their storage locations and the data storage transfer device (drive). The present invention generally relates to systems for and methods of creating a visual display associated with a robot within a data storage library.

2. Description of Related Art

Robots in data storage libraries typically move along rails or tracks disposed on a floor of the library. The robotic movement is controlled via communication with a microprocessor that commands the robot to move along the rails or tracks to a particular location adjacent to either to a storage cell in which a disc or cartridge is located or to a drive for reading or writing data from or onto, respectively, the disc or cartridge.

An outside observer of the library will not know where the robot is located, nor the condition or status of the robot. Conventionally the observer may utilize a host computer with an operator interface to gain knowledge of the position and status, however, this requires that the observer have access, usually through a password-protected interface, to the host computer and involves delay or conflict in utilizing the host computer for such purpose, rather than for its primary purpose of giving writing or reading commands for different media. Also, one may view the robot by opening a door in the housing of the library, however, the door is conventionally under a password-protected lock, and opening the door halts library operations due to safety and other concerns.

In Applicant's prior art system of creating a lighting display associated with the position and status of the robot, one or more multicolor LEDs were mounted on the robot and emitted different-colored light associated with a robot condition displayed on the side of the library. For example, the LEDs emitted green light when the robot was stationary and ready for a task, blue light when moving, orange light when picking a media from storage or from a drive, and red light when there was a problem such as when the robot dropped a media. In the earlier version, the light from the LEDs was directed to a horizontally extending "light pipe" in the form of a bar fashioned of transparent material that received and internally reflected the light and transmitted the light toward a longitudinal end thereof provided with a diffusing surface that essentially confines the light to that diffusing surface viewable horizontally on the library by an observer. The light is displayed from the longitudinal end of the bar toward an upper horizontal side of the library housing. A series of such bars were arranged side-by-side so that as the robot travelled, the light from the LEDs would be sequentially received by and transmitted through bars. An observer or operator outside of the library housing could then determine the status and location of the robot within the housing by seeing the light displayed on the bar on the upper side of the library housing. The light also provided some amusement or entertainment attraction in addition to providing information about the robot position and status.

The prior art system required the installation and utilization of many light pipes or bars and offered visual information about the position and status of the robot from only the side of the library housing from which the light is displayed via the light pipes. Also, the prior art system could not be employed with robots operating in the deep interior of a library. With this background the present invention was developed.

SUMMARY OF THE INVENTION

The present invention relates to systems for and methods of creating a visual display associated with a mobile robot within a data storage library and to libraries including such systems and utilizing such methods.

BRIEF DESCRIPTION OF THE DRAWINGS

The present invention will be described with reference to the accompanying drawings, wherein.

DETAILED DESCRIPTION

Figure 1:
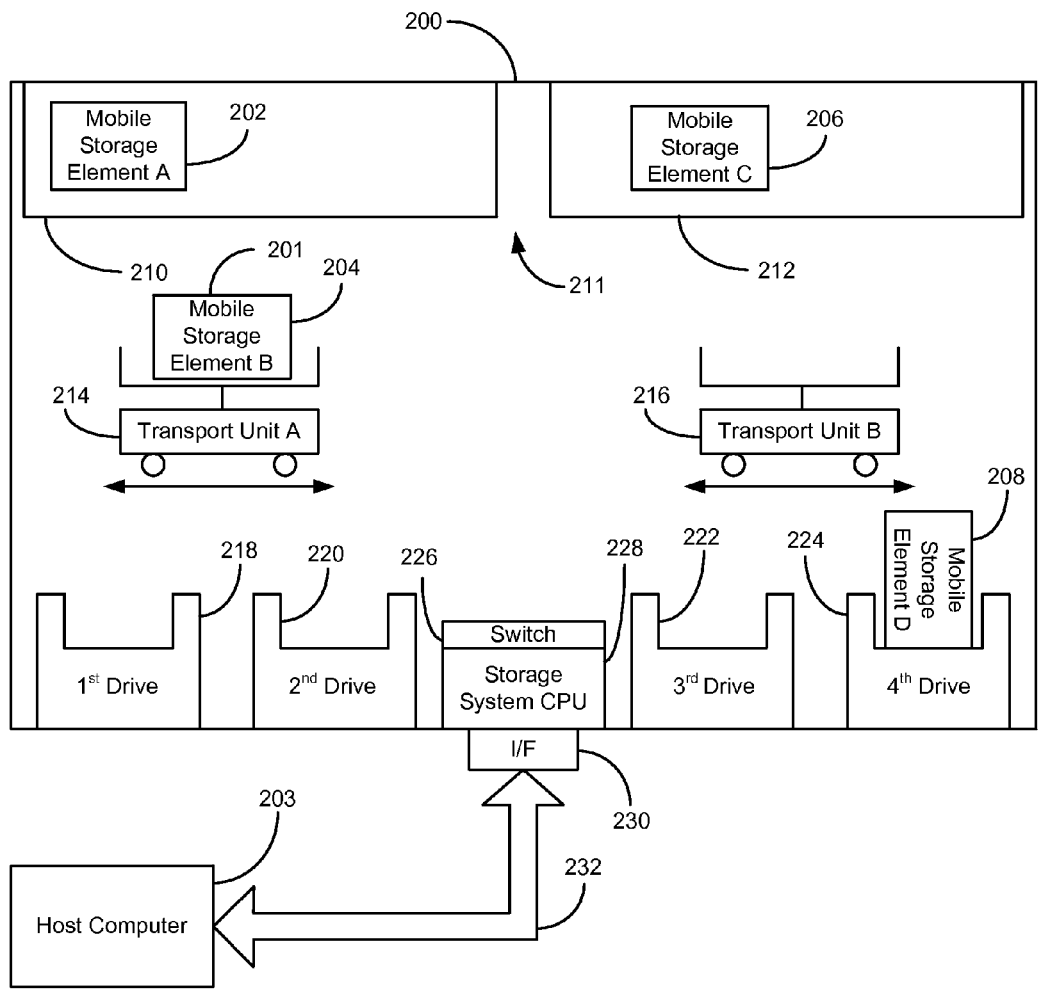
FIG. 1 is a schematic diagram of a data storage library depicting several of the significant components and features thereof.

Preferred embodiments of the present invention will now be described with reference to the accompanying drawings, wherein like reference numerals refer to the same item. The terminology used in the description presented herein is intended to be interpreted in its broadest manner, even though it is being utilized in conjunction with a detailed description of certain specific preferred embodiments of the present invention. It is further emphasized that the following description relates to certain preferred embodiments, and that the invention is directed to and applies to other embodiments that may not be specifically described below.

FIG. 1 shows a diagram of a data storage arrangement 200 with which the present invention may be employed. The present invention may be employed with other arrangements also, and the arrangement shown in FIG. 1 should be considered as only one example of a data storage arrangement in which the present invention may be employed.

The data storage arrangement 200 includes a host computer 203 in communication via path 232 with a storage system 201 via a primary communication interface processor device (I/F) 230 that includes a host port (not shown). The host computer 203 is one exemplary embodiment of a consumer of data; other embodiments can also include a second storage system, similar to storage system 201, or a streaming output device such as a video server, just to name some examples. A consumer of data transmits data or receives data for storage elsewhere, i.e., a consumer of data is generally capable of "taking in" and/or "sending out" data. For example, a host computer 203 is a consumer of data when receiving data (or sending data, such as to the storage system 201), and a storage system 201 is a consumer of data when receiving and sending data to another entity wherein the data is stored. The host computer 203 can be a personal computer, a main frame computer, a server, or any computer system capable of communication with the storage system 201, just to name a few examples. The communication path 232 facilitates communication between the host computer 203 and the storage system 201. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 232 can be in the form of a wire line pathway, wireless, or a combination thereof, for example.

The storage system 201, which may also be considered a data storage library by those skilled in the art, is illustratively shown as generally including a shelf system 211, a first robotic transport unit 214 and a second robotic transport unit 216, four removable storage elements 202, 204, 206 and 208, four drives 218, 220, 222 and 224, a switch system 226, a storage system Central Processing Unit (CPU) 228, which employs a macroprocessor as part of the CPU computing device 228, and as OF 230. As one skilled in the art will recognize, the block diagram of the storage system 201 shows for purposes of simplicity only the primary elements of the exemplary data storage arrangement, and certain necessary structures and components for the aforementioned elements to properly function have been omitted. For example, in practice, the storage system 201 includes all of the necessary wiring, user interface panels, plugs, modular components, entry and exit port(s) to introduce (or remove) removable storage elements into the storage system 201, fault protectors, uninterruptable power supplies, processors, busses, robotic transport unit tracks, indication lights, and so on, in order to function as a data storage library.

In the illustrative arrangement shown in FIG. 1, the shelf system 211 possesses a first shelf 210 and a second shelf 212 each adapted to support the removable storage elements A 202, B 204, C 206, and D 208. The shelf system 211 can possess a single shelf or multiple shelf columns and levels. The shelf system 211 can be located along one side of the storage system 201, as illustratively shown, or optionally in different locations, such as along opposing walls, for example. Furthermore, the shelf system 211 can provide more tailored, accommodating locations adapted specifically to one or more removable storage elements, such as a slot or indentation that matches a removable storage element's footprint. The removable storage element is a storage element that has been adapted for repetitive mobility by a robotic transport unit. The removable storage element can be a disc drive adapted for mobility, a disc drive magazine adapted for mobility, wherein the disc drive magazine comprises a plurality of disc drives, a solid state memory device adapted for mobility, such as a flash memory device, a tape cartridge, a tape magazine comprising a plurality of tape cartridges, an optical disc, a magazine comprising a plurality of optical discs, an independent storage disc, such as a magneto-optical disc or magnetic disc or alternative memory disc used as a storage medium, a magazine comprising a plurality of independent storage discs, or another type of storage device capable of storing data that is adapted for mobility. Further, the removable storage elements are removable from the storage system 201, for example, a tape cartridge, or other mobile storage element, is a removable storage element that can be stored in a location external to the storage system 201 in a vault. Hence, a removable storage element, also called a mobile storage element or a media element herein, is a storage element that is intended to be and capable of being moved and engaged with a data transfer device, such as a drive, cyclically and frequently. The data transfer device (drive) is adapted to receive and substantially support a removable storage element via an opening in the drive such that, when cooperatively linked, a read and/or write relationship is formed (i.e., data storage operations are facilitated between the drive and the removable storage medium). Some examples of a drive include a disc drive docking station, a tape drive, and a disc drive magazine docking station, a docking station for a solid state device.

The storage system 201 illustratively shows four drives 218, 220, 222 and 224, however, in optional embodiments, the library 201 may possess more drives or fewer drives. A drive forms a cooperating relationship with a removable storage element such that data can be written to and/or read from the removable storage element. Examples of various drives include a tape drive that is adapted to receive tape cartridges, a disk drive docking station which receives a disk drive adapted for mobility that when paired forms a cooperating read and write relationship, such as a disk drive inside an exterior casing with electrical contacts designed for high cycle contacting, and a disk drive magazine docking station which receives a removable disk drive magazine, as exemplified in U.S. Application No. 2006/0132964 to Lau et al, and a Compact Disk (CD) drive used with a CD.

With continued reference to FIG. 1, the storage system 201 possesses a first robotic transport unit 214 and a second robotic transport unit 216 wherein the first robotic transport unit 214 is illustratively shown transporting magazine B 204 between a drive 218 and the shelf system 212, and a second robotic transport unit 216 that is available for transporting a removable storage element. The term "robot" may be used herein to abbreviate the term "robotic transport unit" without departing from the scope and spirit of the present invention. It should be appreciated that one or any other number of robots may be included in the arrangement. In the exemplary illustrated arrangement, the robots 214, 216 are adapted to move between the first shelf 210 and the second shelf 212 and all of the drives 218, 220, 222 and 224. Though the robots 214, 216 are illustratively shown as block diagrams, an example of a robotic transport unit is that utilized in a commercial storage system such as a T-950 library or a T-Finity library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps removable storage elements from a shelf system or from a drive to be moved via the associated robotic transport unit. The integrated picker system further is capable of disposing a removable storage element to the shelf system or to a drive. In the illustrative arrangement, the robot merely provides transportation of the removable storage elements between the shelf system 211 and a drive 218, 220, 222, and 224. The robot may provide the added feature of depositing a removable storage element on the shelf system 212 and/or loading the removable storage element in a cooperating relationship with a drive such that data can be read to and/or written from the removable storage element via the drive. In optional configurations, a loading feature can reside with each drive instead of a picker unit integrated with a robotic transport unit.

It will be appreciated by those skilled in the art that the robots 214, 216 are usually designed to travel along the same tracks or rails within the library. It is also possible to add additional cabinets containing additional shelf systems 211 so that the rails or tracks are extended. Typically, in order to conserve space in which the library 201 situated, the robots 214, 216 travel through a tunnel, corridor, or hallway bounded by the shelf system 211, the drives 218, 220, 222, 224, or the walls of the library. Also, typically, the library 201 includes a ceiling so as to inhibit dust and other debris from entering the library, to confine sound and noise generated by library operation, otherwise to ameliorate library operations.

Figure 2:
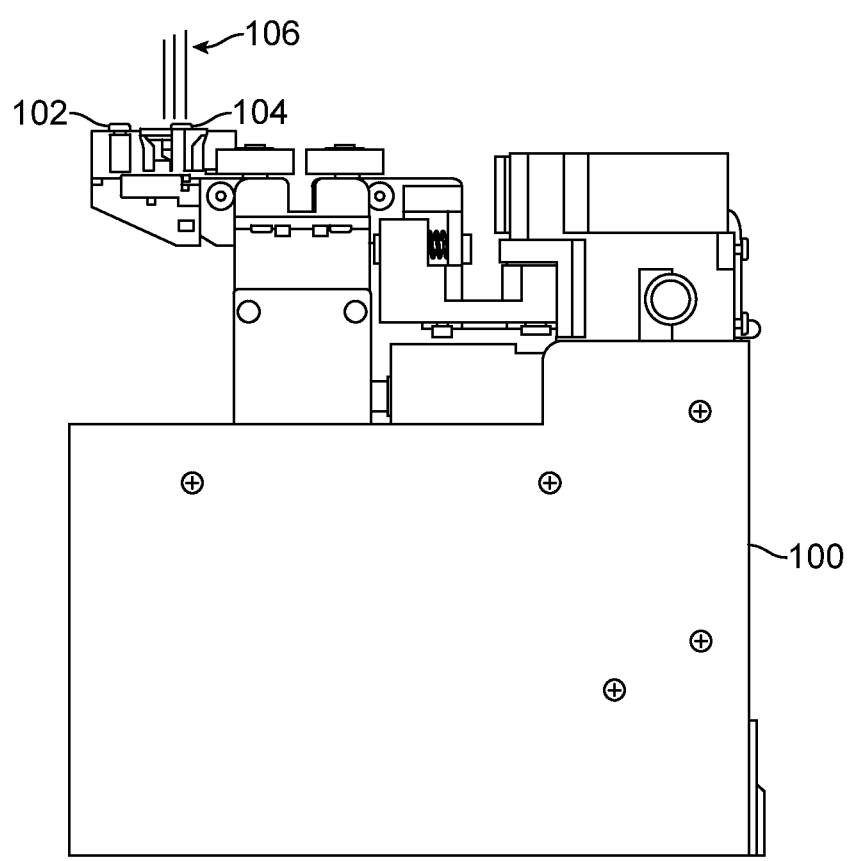
FIG. 2 is a schematic diagram of a mobile robot according to one embodiment of the present invention.

An embodiment of the present invention is shown in FIG. 2, which generally depicts a mobile robot 100 on the top of which is mounted one or more LEDs 102, 104. Preferably at least one of the LEDs is multicolored, and preferably if more than one LED is employed, then the LEDs will be capable of creating a wide variety of different colors. The invention contemplates that other light sources may be advantageously employed as well, such as one or more white light sources with a colored lens cap. As shown in FIG. 2, preferably the light emitted from the light source is directed vertically upward as indicated by the lines 106. As will be appreciated from reading further, the light is preferably directed upward toward a ceiling above the robot 100 and the library 201.

Figure 3:
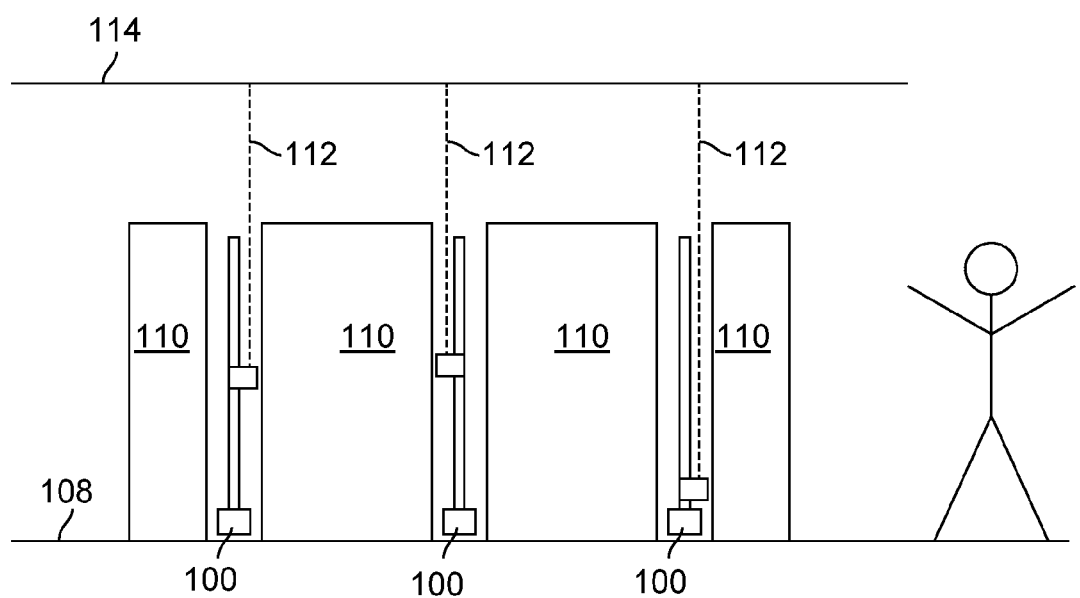
FIG. 3 is a schematic diagram of a a data storage library according to another embodiment of the present invention.

FIG. 3 shows three of the robots 100 of FIG. 2 operationally installed in a library. The library 201 is mounted on a floor 108 of a room and includes a series of racks 110 or shelves in which the media are stored. The racks 110 are spaced to form narrow hallways therebetween in which the robots 100 may translate. Because the media are preferably stored in columns and rows, the robots 100 are capable of moving both horizontally along the corresponding hallway to access media in different columns in the racks 110 and vertically to access media in different rows in the racks 110. Preferably the robots 100 are capable also of accessing media stored on each side of the hallway such that the pickers of the robots are rotatable so as to face and access each side or such that the picker has two picking mechanisms, one on each side of the picker.

Light emitted from each of LED is directed vertically upward as shown by the dashed lines 112 in FIG. 3 and eventually hits the ceiling 114 of the room in which the library 201 is disposed. The present invention also contemplates that the ceiling 114 may be a suspended ceiling that floats above the library 201 rather than the ceiling 114 that partially forms the room. The light emitted from the LEDs is also preferably manipulated so that the light hitting the ceiling 114 preferably creates a relatively small, intense spot. Such manipulation may be accomplished, for example, by placing a focusing lens over each LED, by collimating the light such as through a tube having a reflective inner surface, and by utilizing an elliptical reflector like those used with automobile headlights.

It will be appreciated from reviewing FIG. 3 that when a person is outside the library, the person usually will not be able to see any robot 100 within the library 201, but will be able to see the light emitted from the LEDs that hits the ceiling 114, and will thereby know the position of each robot 100 directly vertically below.

In a basic embodiment, the invention contemplates that one or more LEDs will emit a single color of light that will hit the ceiling 114 and will indicate the position of the robot 100 below. The invention also contemplates that instead of the light being of a steady intensity, the light may flash or blink on and off or may pulse in intensity. An LED may emit a single color of light, but may present that single color in different temporal flashes or pulses of intensity, for example, such as steady for when the robot 100 is stationary and ready for a task, and flashing or pulsing when the robot 100 is moving. The flashes or pluses may be of a regular temporal length occurring at regular temporal intervals, or may be irregular. For example when there is a problem or malfunction related to the robot 100, then the LED may emit a visual display such as a red light in the form of the Morse code "SOS" signal: three short flashes or pulses, followed by three long pulses, followed by three short pulses—all occurring at even time intervals.

In another alternative or additional embodiment, the invention contemplates that one of more LEDs will create a selected, different colored light to indicate an associated different condition or status of the robot 100, such as green when the robot 100 is stationary and ready for a task, blue when the robot 100 is moving, orange when the robot 100 is picking a media from storage or from a drive, yellow when the robot 100 is placing media into storage or into a drive, and red when there is a problem such as when the robot 100 drops a media. Likewise, condition-indicating light colors may flash or blink or may pulse in intensity. Other conditions may also be selected to be associated with a particular color, for example, such as when the robot 100 is stationary and waiting to remove a media from a drive. In such an embodiment, a person outside the library 201 thus will know the condition or status of each robot 100 by viewing the colors hitting the ceiling 114.

The visual display on the ceiling may be circular, oval, elliptical, bar-shaped, cross-shaped, star-shaped, or other configurations. In order to create such configurations, either the periphery of the LED itself, a transparent portion of a lens cap over the LED, or the internal periphery of a collimating tube above the LED may assume that particular configuration so that the periphery of the light beam emitted upward will assume such configuration. The invention also contemplates that the LED, a lens cap over the LED, or a collimating tube above the LED may be pivotable or swivelable in response to a servo-motor controlled by a microprocessor to create yet other visual displays and patterns, such as a FIG. 3, on the ceiling.

Embodiments of the invention further contemplate that one may select either a unique color, a unique configuration, a unique pattern, or any combination of the foregoing to be associated with a particular condition or status of the robot.

Embodiments of the invention thus indicate the position of the mobile robot 100 within the library 201, indicates a condition or status of the robot 100, or both. As such, an operator need not access a host computer or open a library housing door to determine what is happening with the robot 100, but may simply view the ceiling 114 above the library 201. If desired, the operator may then double check that position or condition via the host computer or by a physical inspection of the library 201. Additionally, the invention creates amusement or entertainment for observers in the vicinity of the library 201, especially if there is a plurality of robots 100 in the library 201 that employ the invention. The invention creates an excitement or wonderment of action occurring, but unobserved, within the library 201 that reveals itself through visual displays that sometimes may be different colors, in different patterns, at different locations, or moving along the ceiling 114 above the library 201.

The switches, rheostats, servo-motors, and other devices that control the operation of the LEDs or other light sources may in turn be controlled by a microprocessor that receives and processes electrical signals regarding the condition or status of the robot 100.

While exemplary embodiments have been presented in the foregoing description of the invention, it should be appreciated that a vast number of variations within the scope of the invention may exist including other methods of determining probe insertion positioning. The foregoing examples are not intended to limit the nature or the scope of the invention in any way. Rather, the foregoing detailed description provides those skilled in the art with a foundation for implementing other exemplary embodiments of the invention.

What is claimed is:

1. A method of creating a visual display on a ceiling above an automated data storage library including a plurality of storage locations adapted to receive and store recording media on which data is contained, at least one drive for either writing data onto or reading data from said media, and at least one mobile robot adapted to move media between said storage locations and said at least one drive and to insert said media into said at least one drive and to remove said media from said at least one drive, said method comprising: moving said robot; and creating the visual display on said ceiling associated with the position of said at least one robot.

2. The method according to claim 1 wherein said visual display is created directly vertically above said at least one robot.

3. The method according to claim 1 wherein said visual display is also associated with a condition of said at least one robot selected from the group consisting of stationary inactivity, translating with or without a media being moved, loading a media into or removing a media from said at least one drive, waiting for a media to be finished being written onto or read by said at least one drive, and a malfunction related to said at least one robot.

4. The method according to claim 3 wherein said visual display includes at least two different colors of light.

5. The method according to claim 3 wherein said visual display includes at least two different patterns of light, with one pattern associated with a first one of said conditions and another pattern associated with a second one of said conditions.

6. The method according to claim 5 wherein at least one of said different light patterns includes temporal changes in the intensity of said visual display.

7. A method of creating a visual display on a ceiling above an automated data storage library including a plurality of storage locations adapted to receive and store recording media on which data is contained, at least one drive for either writing data onto or reading data from said media, and at least one mobile robot adapted to move media between said storage locations and said at least one drive and to insert said media into said at least one drive and to remove said media from said at least one drive, said method comprising: moving said robot; and creating the visual display on said ceiling associated with a condition of said at least robot selected from the group consisting of stationary inactivity, translating with or without a media being moved, loading a media into or removing a media from said at least one drive, waiting for a media to be finished being written onto or read by said at least one drive, and a malfunction related to said at least one robot.

8. The method according to claim 7 wherein said visual display is created directly vertically above said at least one robot.

9. The method according to claim 7 wherein said visual display includes at least two different colors of light.

10. The method according to claim 7 wherein said visual display includes at least two different patterns of light, with one pattern associated with a first one of said conditions and another pattern associated with a second one of said conditions.

11. The method according to claim 10 wherein at least one of said different light patterns includes temporal changes in the intensity of said visual display.

12. A method of creating a light display on a ceiling at a location directly, vertically above a mobile robot in an automated data storage library, said method comprising: moving said robot; and creating the light display on said ceiling at a location directly, vertically above said robot as said robot moves.

13. The method according to claim 12 wherein said light display includes at least three different colors of light.

14. The method according to claim 12 wherein said light display includes modifying the intensity of said light display.

15. A method of creating a light display on a ceiling at a location directly, vertically above a mobile robot in an automated data storage library, said method comprising: providing a light source capable of emitting at least three different colors of light; mounting said light source on said robot such that light emitted from said light source is directed substantially vertically upward; and causing the at least three different colors of light to be emitted from said light source, each different color associated with one of at least three conditions of said robot selected from the group consisting of stationary inactivity, translating with or without a media being moved, loading a media into or removing a media from said at least one drive, waiting for a media to be finished being written onto or read by said at least one drive, and a malfunction related to said at least one robot.

16. The method according to claim 15 causing light emitted from said light source to repeatedly blink.

* * * * *